US012719855B2

(12) United States Patent
Rakhimov

(10) Patent No.: US 12,719,855 B2
(45) **Date of Patent: *Aug. 25, 2026**

(54) SYSTEMS AND METHODS FOR GENERATING A SNAPSHOT VIEW OF NETWORK INFRASTRUCTURE

(71) Applicant: Bank of Montreal, Toronto (CA)

(72) Inventor: Rinat Rakhimov, Toronto (CA)

(73) Assignee: Bank of Montreal, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/640,612

(22) Filed: Apr. 19, 2024

(65) Prior Publication Data

US 2024/0264922 A1 Aug. 8, 2024

Related U.S. Application Data

(63) Continuation of application No. 16/439,510, filed on Jun. 12, 2019, now Pat. No. 11,966,318.

(Continued)

(51) Int. Cl.
*G06F 11/30* (2006.01)
*G06F 11/34* (2006.01)
(Continued)

(52) U.S. Cl.
CPC ........ *H04L 63/083* (2013.01); *G06F 11/3447* (2013.01); *H04L 67/02* (2013.01); *H04L 67/12* (2013.01)

(58) Field of Classification Search
CPC ....... H04L 63/083; H04L 67/02; H04L 67/12; H04L 41/22; H04L 41/0853;
(Continued)

(56) References Cited

U.S. PATENT DOCUMENTS 7,363,369 B2 4/2008 Banerjee et al.
7,418,719 B2 8/2008 Kariv et al.
(Continued)

OTHER PUBLICATIONS

Canadian Office Action issued in CA Appl. Ser. No. 3045863 dated Apr. 7, 2021 (5 pages).

(Continued)

*Primary Examiner* — Eyob Hagos
(74) *Attorney, Agent, or Firm* — Foley & Lardner LLP

(57) ABSTRACT

A computer may receive a request to generate a snapshot view of the enterprise network infrastructure. The computer may implement a multithread process to contemporaneously query a plurality of blade servers and server enclosures within the entire network infrastructure. The computer may contemporaneously receive a plurality of information files from the queried network resources (e.g. the blade servers, server enclosures). An information file for a network resource may contain information of the network resource such as the operating status, currency (also referred to as assembly date), hardware serial number, firmware version, and/or other information of the network resources. Integrating the information in the received files, the computer may generate snapshot view file. The snapshot view file may be in hypertext markup language (HTML) format. The computer may transmit a selectable link to the snapshot view file to multiple user devices to be displayed in the respective web browsers.

20 Claims, 6 Drawing Sheets

200

Related U.S. Application Data

(60) Provisional application No. 62/684,071, filed on Jun. 12, 2018.

(51) Int. Cl.
*H04L 9/40* (2022.01)
*H04L 41/0853* (2022.01)
*H04L 67/02* (2022.01)
*H04L 67/12* (2022.01)

(58) Field of Classification Search
CPC ............. H04L 63/0815; G06F 11/3447; G06F 11/3006; G06F 11/328; G06F 2201/84
See application file for complete search history.

(56) References Cited

U.S. PATENT DOCUMENTS 10,021,088 B2* 7/2018 Innes .................... H04L 9/3263
10,249,014 B2 4/2019 Bala et al.
10,756,990 B1* 8/2020 Chakkassery Vidyadharan .......... G06F 11/301
10,855,469 B2* 12/2020 Doyon .................. H04L 63/083
2002/0172169 A1* 11/2002 Rosen ..................... H04M 3/56 370/335
2004/0133731 A1 7/2004 Sorrentino et al.
2007/0112951 A1 5/2007 Fung et al.
2008/0301135 A1* 12/2008 Alves .................. G06F 16/2453
2009/0125580 A1* 5/2009 Canning ............... H04L 67/125 709/203
2013/0024543 A1* 1/2013 Thomas .................. H04L 67/02 709/217
2014/0068040 A1* 3/2014 Neti ........................ G06F 9/485 709/223
2014/0207918 A1 7/2014 Kowalski et al.
2014/0325620 A1 10/2014 Samson et al.
2015/0089614 A1* 3/2015 Mathew .............. H04L 65/1069 726/7
2015/0248460 A1* 9/2015 Machida ............... G06F 16/128 707/639
2015/0326664 A1 11/2015 Richter
2016/0078050 A1* 3/2016 Dhakar ............... G06F 16/2308 707/648
2016/0188368 A1 6/2016 Petit
2016/0197849 A1 7/2016 Self et al.
2017/0041360 A1* 2/2017 Wallace .................. H04W 4/80
2017/0102757 A1* 4/2017 Kang .................. H04L 41/0896
2018/0069747 A1* 3/2018 Kraus ................. H04L 67/1001
2019/0058723 A1 2/2019 Kraning et al.
2019/0280914 A1 9/2019 Menon

OTHER PUBLICATIONS

Canadian Office Action issued in CA Appl. Ser. No. 3045863 dated Jul. 6, 2020 (5 pages).
Final Office Action issued for U.S. Appl. No. 16/439,510 dated May 19, 2022 (17 pages).
Final Office Action on US Appl. U.S. Appl. No. 16/439,510 dated Mar. 16, 2023 (39 pages).
Non-Final Office Action issued for U.S. Appl. No. 16/439,510 dated Sep. 2, 2022 (22 pages).
Non-Final Office Action on U.S. Appl. No. 16/439,510 dated Aug. 17, 2023 (35 pages).
Notice of Allowance on U.S. Appl. No. 16/439,510 dated Dec. 22, 2023 (15 pages).
US Office Action issued for U.S. Appl. No. 16/439,510 dated Nov. 29, 2021 (13 pages).
CA Office Action for Application No. 3162638 mailing date Mar. 13, 2025, 3 pages.

* cited by examiner

200

500

600

SYSTEMS AND METHODS FOR GENERATING A SNAPSHOT VIEW OF NETWORK INFRASTRUCTURE

CROSS REFERENCE TO RELATED APPLICATIONS

This application is a continuation of U.S. application Ser. No. 16/439,510, filed Jun. 12, 2019, which claims the benefit of U.S. Provisional Application No. 62/684,071, filed Jun. 12, 2018, each of which is incorporated by reference in its entirety.

TECHNICAL FIELD

This application relates generally to a tool for maintaining and monitoring network infrastructures.

BACKGROUND

Enterprise network infrastructures are quite complex containing interconnected but geographically distributed network computers and other network resources. For example, a modern day enterprise may have multiple datacenters and/or server farms. Furthermore, a single server farm or a datacenter may contain several servers and several other computing resources. In the server farms and datacenters, blade server technology has allowed enterprises to configure several servers within a single enclosure—further increasing the complexity of a typical enterprise network infrastructure. Monitoring and managing a complex enterprise network infrastructure becomes a complex operation in itself.

The conventional solutions for monitoring and managing a complex enterprise network infrastructure have several technical shortcomings. For example, a conventional solution queries vendor maintained database to retrieve the operating status of respective network resources. However, due to a sophisticated nature of enterprise scale networks that may include multiple geographically dispersed sites, firewalls and other infrastructure entities, the vendor maintained database and respective web front application servers may represent an additional layer of complexity themselves. In such complex environments such databases also may not be fully updated in real time and may contain incomplete and/or old data thereby not presenting the current state of network resources. Furthermore, these databases are prone to errors, wherein the errors may be introduced during the write cycles or due to the programming bugs. Also, the database may not be available to receive queries all the time, thereby reducing a system administrator's ability to efficiently monitor and manage an enterprise network infrastructure.

Additionally, the conventional solutions do not provide an integrated snapshot view containing the relevant information needed by a system administrator. The vendor maintained database, apart from not being contemporaneous and error-free, may not store all the relevant information. The information pieces received from other devices and databases may be scattershot and the system administrator may have to manually sift through the received information to retrieve relevant information.

Furthermore, conventional systems required specialized software and hardware resources. For example, one has to install a webserver and a database server to continuously gather information from multiple network resources within a network infrastructure. Specialized software may be required to interface with the webserver or database server to generate and display results based on the gathered information. The conventional setup with additional hardware and software resources may be slow, inefficient, and bulky to maintain.

SUMMARY

What is therefore desired is a system and method that generates a snapshot view of various network resources with the relevant information. What is further desired is an agentless system and method that generates the snapshot view without a third party database.

Embodiments disclosed herein provide solutions to the aforementioned problems and provide other solutions as well. A computer may receive a request to generate a snapshot view of the enterprise network infrastructure. The computer may implement a multi-threaded process to contemporaneously query a plurality of blade servers and server enclosures within the entire network infrastructure. The computer may contemporaneously receive a plurality of information files from the queried network resources (e.g., the blade servers, server enclosures). An information file for a network resource may contain information of the network resource such as the operating status, currency (also referred to as assembly date), hardware serial number, firmware version, and/or other information of the network resources. Integrating the information in the received files, the computer may generate snapshot view file. The snapshot view file may be in hypertext markup language (HTML) format. The computer may transmit a selectable link to the snapshot view file to multiple user devices. A user, such as a system administrator, may select the link and the respective user device may display the snapshot view in an application such as a web browser.

In an embodiment, a computer-implemented method for generating a snapshot view containing hardware information and status in a status of a network infrastructure comprises: receiving, by a computer, a request to generate the snapshot view, wherein the request includes an input text file containing a plurality of internet protocol addresses of a plurality of servers in the network infrastructure; during a first thread of operation executed by the computer: querying, by the computer, using a first internet protocol address of the plurality of internet protocol addresses, a first server of the plurality of servers to retrieve a first resource data record containing hardware information and a status of the first server; during a second thread of operation executed by the computer contemporaneously with the first thread of operation: querying, by the computer, using a second internet protocol address of the plurality of internet protocol addresses, a second server of the plurality of servers to retrieve a second resource data record containing hardware information and a status of the second server, wherein the computer only queries the first and second servers during each of the first and second threads of operation for hardware information and status; generating, by the computer, a hypertext markup language snapshot view file of the network infrastructure based upon the first and second resource data records; and transmitting, by the computer to a user device, an electronic communication containing a selectable link configured to retrieve the snapshot view file from the computer and cause the user device to generate the snapshot view using the snapshot view file.

In another embodiment, a system comprises a non-transitory storage medium configured to store a snapshot view engine; a processor connected to the non-transitory storage medium and configured to: receive a request to execute the snapshot view engine and generate a snapshot view containing hardware information and status, wherein the request includes an input text file containing a plurality of internet protocol addresses of a plurality of servers in the network infrastructure; during a first thread of operation executed by the processor: query using a first internet protocol address of the plurality of internet protocol addresses, a first server of the plurality of servers to retrieve a first resource data record containing hardware information and a status of the first server; during a second thread of operation executed by the processor contemporaneously with the first thread of operation: query using a second internet protocol address of the plurality of internet protocol addresses, a second server of the plurality of servers to retrieve a second resource data record containing hardware information and a status of the second server, wherein the processor only queries the first and second servers during each of the first and second threads of operation for hardware information and status; generate a hypertext markup language snapshot view file of the network infrastructure based upon the first and second resource data records; and transmit to a user device, an electronic communication containing a selectable link configured to retrieve the snapshot view file and cause the user device to generate the snapshot view using the snapshot view file.

BRIEF DESCRIPTION OF THE DRAWINGS

The accompanying drawings constitute a part of this specification and illustrate embodiments of the subject matter disclosed herein.

DETAILED DESCRIPTION

Figure 1:
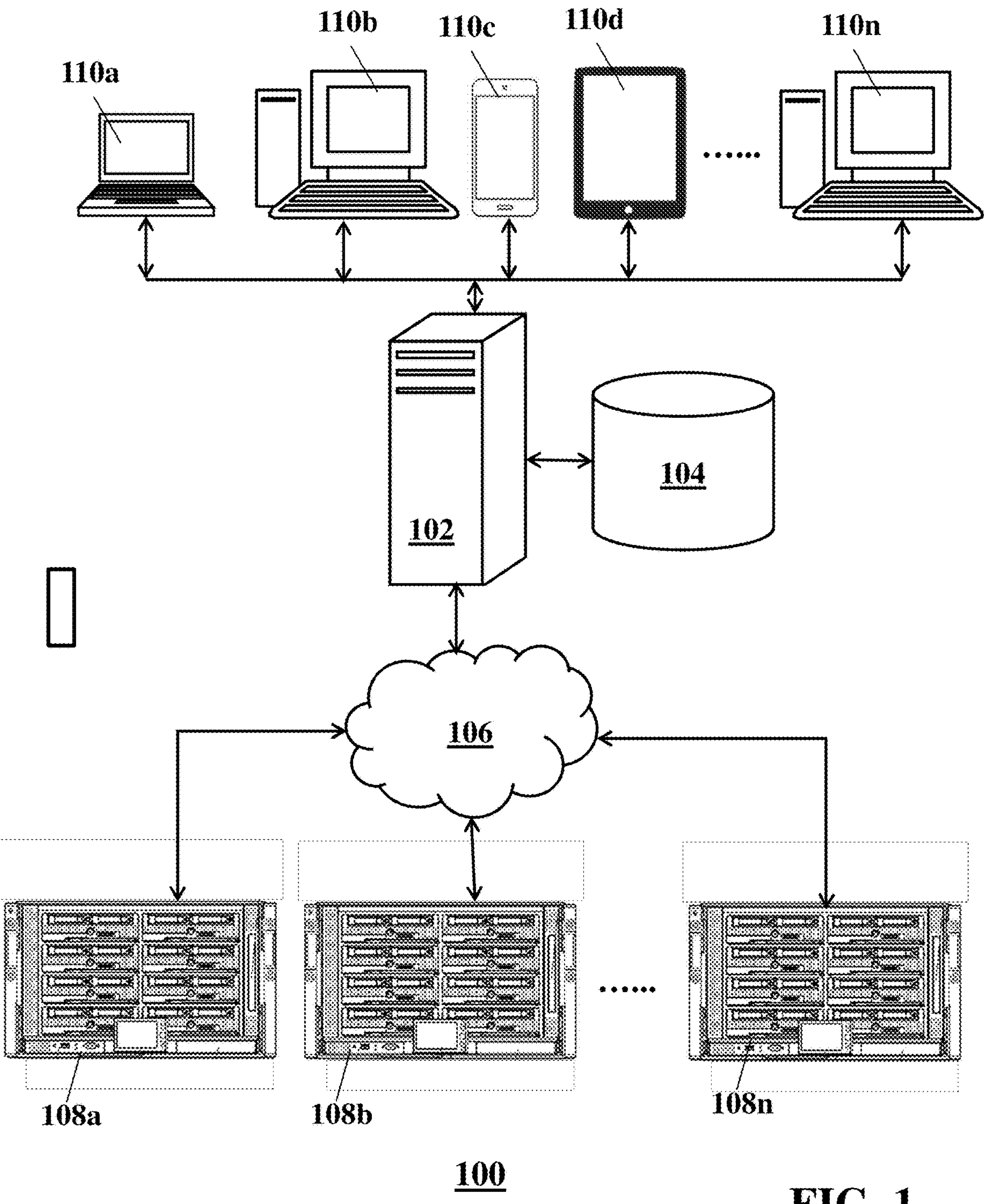
FIG. 1 shows an illustrative network environment in which a server generates a snapshot view of a network infrastructure.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein present a snapshot view of a network infrastructure using a one-click approach. The snapshot view can include hardware information (which may include firmware information) and status in the network infrastructure. Instead of executing complex protocols, a user, such as a system administrator, may launch a single copy of a snapshot view engine on a computer. In response, the computer may directly query the network resources in the network resources within the network infrastructure to retrieve hardware statistics, system state, and currency data (indicating the assembly date of a respective network resource). The method executed by the computer is therefore agentless because the method is based on a direct scan principle without using external databases, repositories, data collectors, or agents.

The computer may execute the snapshot view engine as a multi-threader. In other words, the computer may spin multiple threads of operations, with each thread of operation querying and retrieving information from a respective network resource contemporaneously with other threads. Using the multi-threaded approach, the computer may collect data from virtually unlimited number of network resources within a reasonable time-frame. The only limits imposed on the computer for such multi-threaded operation is hardware capability of the computer and the network resources and the throughput capability of the enterprise network infrastructure.

The snapshot view engine may rely upon RESTful API to upload the newly generated reports on a SharePoint site. There may be a retention mechanism allowing reports rotation on the SharePoint as per defined retention settings. At the same time, the snapshot view engine is capable of sending e-mail notifications to selected distribution lists. The notification may include a newly generated report URL as well as a link to a folder containing previous reports stored in accordance with the retention policies.

FIG. 1 shows an illustrative network environment 100, according to an exemplary embodiment. The snapshot view of a network infrastructure may be generated within the illustrative network environment 100. The network environment 100 may comprise an application server 102, a storage 104, network 106, a plurality of server enclosures **108*a*, 108*b*, . . . , 108*n* (collectively or commonly referred to as 108), and a plurality of user devices 110*a*, 110*b*, 110*c*, 110*d*, . . . , 110*n* (collectively or commonly referred to as 110). It should be understood that the illustrative network environment 100** is merely an example, and other network environments with additional, substitute, or lesser components should be considered to be within the scope of this disclosure.

The application server 102 may be any computing device comprising a processor and non-transitory machine-readable storage capable of executing the various tasks and processes described herein. The application server 102 may receive requests to generate a snapshot view from one or more of the client devices 110 or launch a respective task automatically within its own address space on a scheduled basis. Non-limiting examples of such computing devices may include workstation computers, laptop computers, server computers, and the like. While the illustrative network environment 100 includes a single application server 102, it should be appreciated that that in some embodiments the application server 102 may include any number of computing devices operating in a distributed computing environment.

The storage 104 may be any type of database containing files utilized for implementing one or more operations within the network environment 100. For example, the storage 104 may contain application binaries, log files, and/or any other type of files used by the application serve 102 implementing one or more operations. Although the illustrative network environment 100 shows the storage 104 apart from the application server 104, the storage 104 may be located within the application server 102 itself.

The network 106 may be any type of communication medium such as a local area network (LAN), metropolitan area network (MAN), and/or a wide area network (WAN). For instance, the network 106 may be the internet. The network 106 may be a combination of various wired and wireless links capable of carrying data packets in between the application server 102 and the server enclosures 108.

Each of the server enclosures 108 may contain a plurality of blade servers. Non-limiting examples of the server enclosures 108 and constituent blade servers may include HPE Bladesystem®, Cisco Unified Computing System® (UCS), IBM BladeCenter®, Dell PowerEdge®, and/or any other type of blade server enclosures and blade servers. Each server enclosure 108 may include a chassis for holding the constituent blade servers and further provide an integrated power management and cooling features. Within a server enclosure 108, an onboard administrator (OA) may module control the operation of the multiple blade servers.

The user devices 110 can be any kind of computing devices. Non-limiting examples of user devices may include laptop computer 110*a*, desktop computers 110*b*, 110*n*, smartphone 110*c*, and tablet computer 110*d*. The user devices 110 may communicate with the application server to transmit a request to generate a snapshot view of a network infrastructure. Furthermore, the user devices 110 may receive a snapshot view file or a link to a snapshot view file and display a snapshot view.

Figure 2:
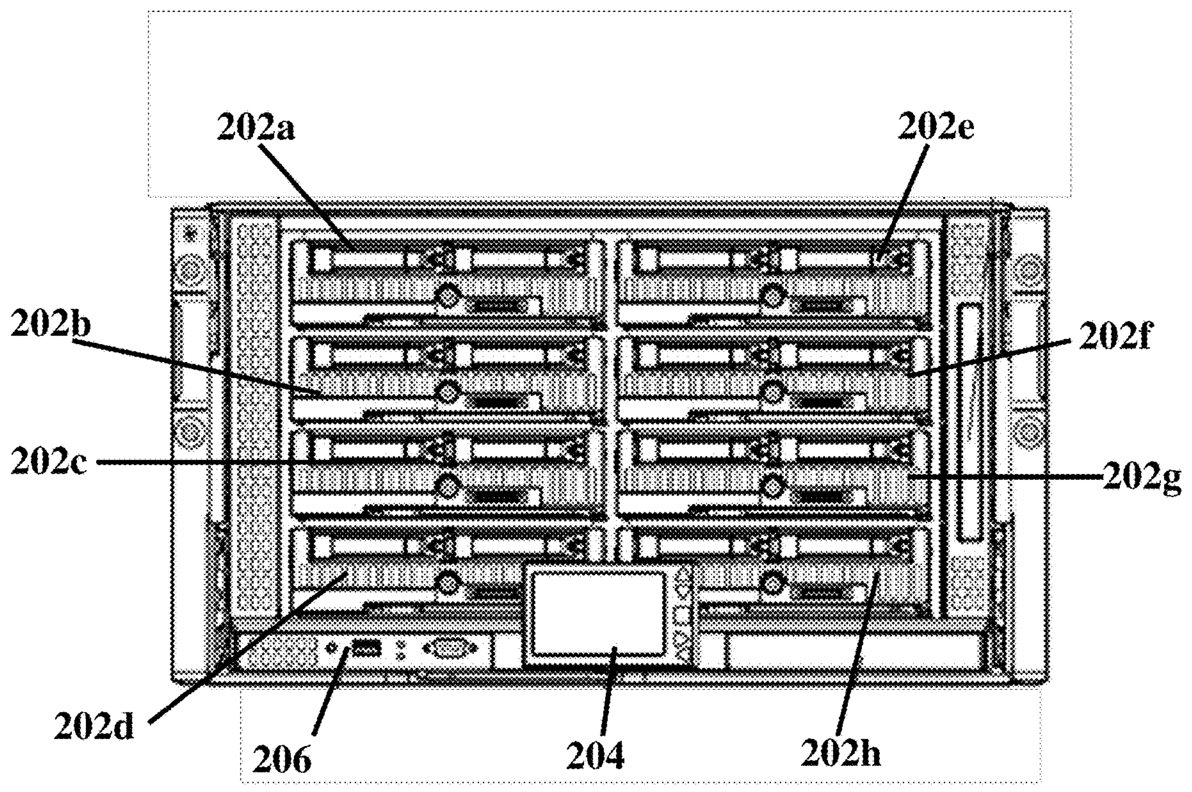
FIG. 2 shows an illustrative server enclosure with a plurality of illustrative blade servers.

FIG. 2 shows an illustrative server enclosure 200, according to an embodiment. The server enclosure 200 may include a plurality of blade servers 202*a*, 202*b*, 202*c*, 202*d*, 202*e*, 202*f*, 202*g*, 202*h* (collectively or commonly referred to as 202), a user interface 204, and a plurality of input/output ports 206. The server enclosure 200 may manage power and cooling to each of the blade servers 202. A system administrator or another user may use the input/output ports 206 to access the enclosure 200 or one or more blade servers 202 enclosed therein. The user interface 204 may allow the system administrator or another user to configure one or more features of the enclosure 200 or the one or more blade servers 202 contained therein.

Figure 3:
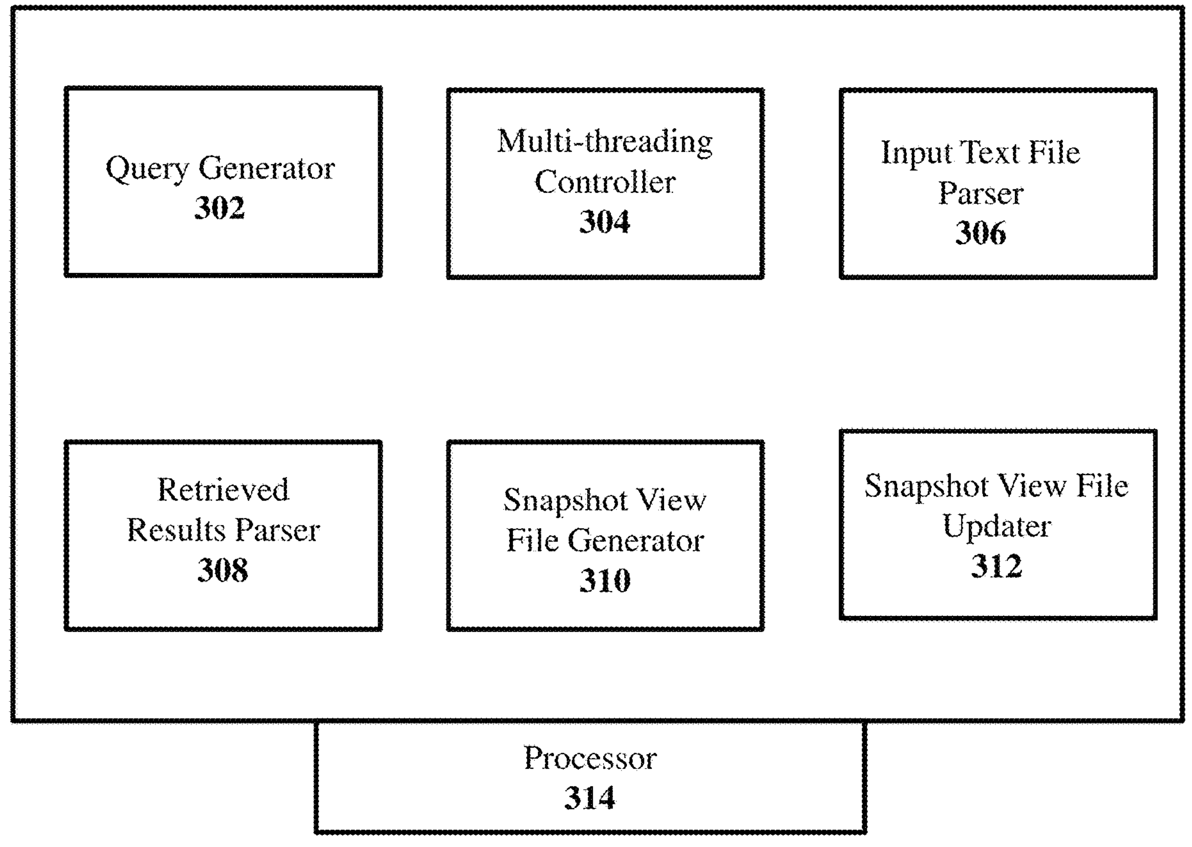
FIG. 3 shows illustrative software modules executed by a computer to generate a snapshot view of a network architecture.

FIG. 3 shows a block diagram showing illustrative software modules 300 implementing one or more processes described throughout this disclosure. A processor 314 may execute the software modules 300. The software modules 300 may include a query generator module 302, a multi-threading controller module 304, an input text file parser module 306, a retrieved results parser module 308, a snapshot view file generator module 310, and a snapshot view file updater module 312.

The query generator module 302 may generate queries to a plurality of network resources, such as blade servers and server enclosures, based on a request to generate a snapshot view of a network infrastructure formed by the network resources. The query generator module 302 may customize query based on the firmware of a respective network resource, based upon the application programming interface (API) of the respective network resource. For example, the query generator module 302 may generate a first query for a server enclosure and a second query, different from the first, for a blade server.

The multi-threading controller module 304 may manage and control the multi-threading operation of the software modules 300. For instance, the multi-threading controller module 302 may spin a first thread for a first query to a first network resource and a second thread for a second query to a second network resource. Furthermore, under the control of the multi-threading controller 304, the first thread may execute a first listener for any response data from the first network resource and the second thread may execute a second listener for any response data from the second network resource. It should be understood that the two threads described here are merely for illustration, and the multi-threading controller module 304 may implement hundreds of threads during a single launch of the software modules 300.

The input text file parser module 306 may parse an input file to retrieve the addresses of the network resources to be queried. In some instances, an input text file may contain a list of internet protocol (IP) addresses of the network resources and the input text file parser module 306 may retrieve the IP addresses and pass the retrieve IP addresses to the query generator module 302 and the multi-threading controller module 304 to run a query for each of the IP addresses. The input text file may be in any format such as comma delimited, space delimited, and/or any other type of format. Furthermore, the input text file is intended to be illustrative, and files of other formats, such as Microsoft Excel, should be considered within the scope of this disclosure.

The retrieved results parser module 308 may receive files from the queried network resources and parse the received files to extract relevant information. For example, the received files may be space delimited text containing information such as operation status, hardware serial number, assembly date, firmware version and date, and/or any other attributes of a respective network resource. The retrieved results parser module 308 may parse and extract the aforementioned and other information from the received files. Furthermore, multi-threading controller module 304 may execute multiple instances of the retrieved results parser module 308 such that multiple received files are parsed contemporaneously for a faster and more efficient operation.

The snapshot view file generator module 310 may integrate information extracted from each of the received files to generate a snapshot view file. In other words, the snapshot view file may contain information on a plurality of network resources. In some instances, the snapshot view file generator module 310 may generate the snapshot view file in hypertext markup language (HTML) format such that a user may open the snapshot view file using a web-browser.

The snapshot view file updater module 312 may update a snapshot view file based new queries from the query generator module 302 and new files received from the respective hardware resources. For example, a user may request a new snapshot view with updates to a subset of network resources in an existing snapshot view. The snapshot view file updater module 312 may invoke the query generator module 302 in association with the multi-threading controller module 304 to run queries on the requested subset of network resources to update the existing snapshot view. In some embodiments, the snapshot view file updater module 312 may run periodic queries on one or more network resources in an existing snapshot view based on the request from the user.

One having ordinary skill in the art should understand that the respective functionality of the aforementioned software modules is merely illustrative and similar functionality may be achieved by different set of software modules. Furthermore, the software modules described herein may achieve alternative and additional functionality, which should be considered to be within the scope of this disclosure.

Figure 4:
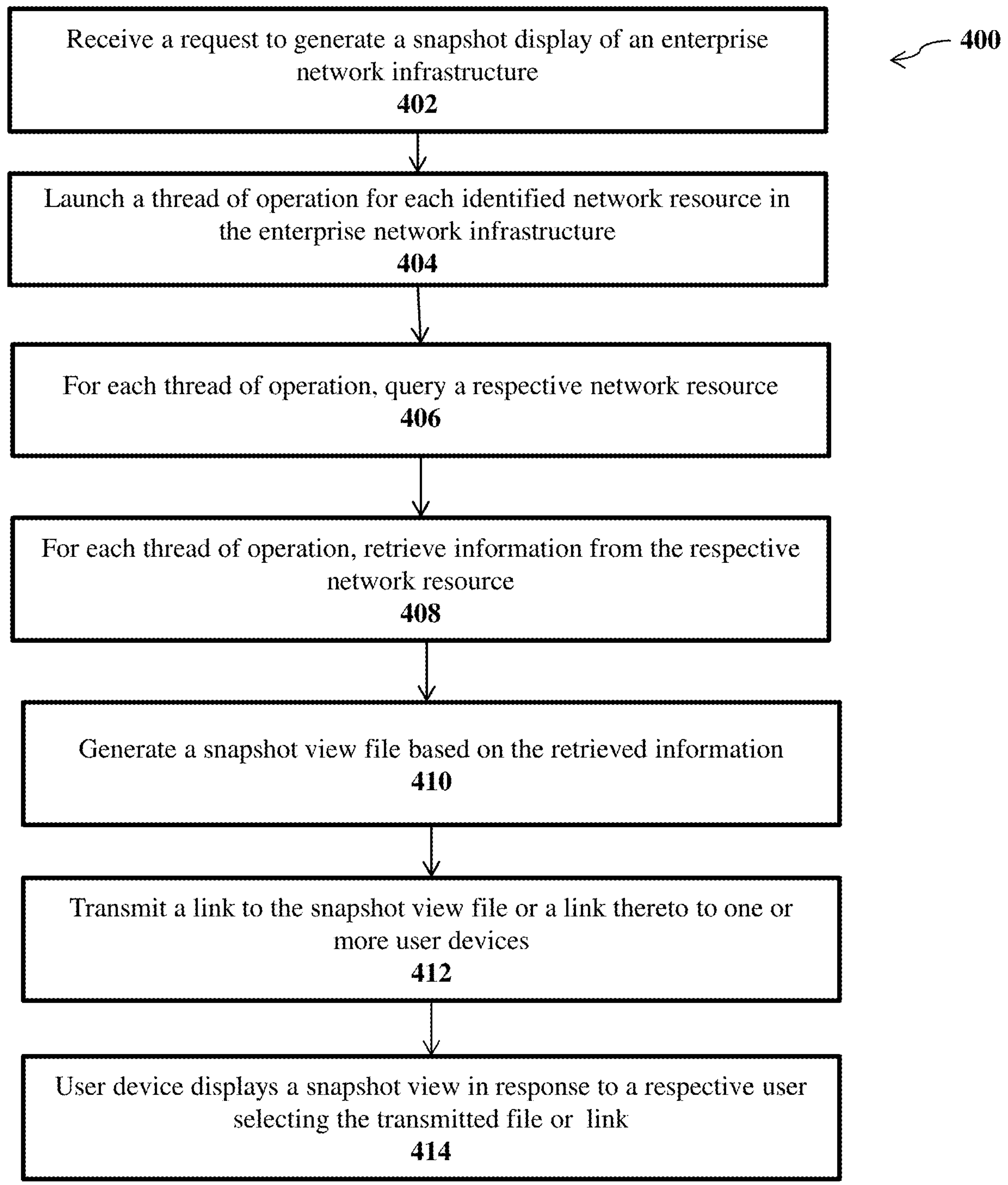
FIG. 4 shows an illustrative flow diagram of a method to generate a snapshot view of network architecture.

FIG. 4 shows a flow diagram 400 of a method for generating a snapshot display, according to an illustrative embodiment. Although multiple computers may execute the steps of the method shown in the flow diagram 400, this description details, for brevity, a computer executing the steps of the method. It should also be understood that the method steps described below are merely illustrative and additional, alternate, and/or lesser number of steps should be considered to be within the scope of this disclosure.

The method may begin at step 402, where the computer may receive a request to generate a snapshot display of an enterprise network architecture. In some instances, the request may be in the form of an executable binary file placed for automated runs in a computer. For example, if the computer is a Windows machine, a user (such as a system administrator) may place the executable binary file in the Task Scheduler for automated runs. In other instances, the user may manually launch the executable binary file from a command line interface (CLI) such as Windows Powershell, command line shell, Apple Commandshell, and Linux Bash. In yet other instances, the user may click on an icon displayed by the computer in a graphical user interface (GUI), and, the computer may execute the executable binary in response to receiving the click.

In addition to launching the executable binary file by any of the aforementioned actions, the user may also provide a list of internet protocol (IP) addresses for each of the network resource that the computer has to retrieve status information and other information. In other words, the list of IP addresses may identify network resources to be queried by the computer. Non-limiting examples of the network resource include blade servers, server enclosures, rack servers, routers, switches, and any other type of network device. The IP address is merely illustrative, and the user may provide other types of address used to access the respective network resource such as machine access code (MAC). The user may provide the list of IP address or any other type of address in a text file that the executable binary file may access. In some instances, the addresses may be hardcoded in the executable binary file itself. In other instances, the computer may receive the addresses during the runtime of the executable binary file. The aforementioned techniques of the computer receiving the list of IP addresses or any other type of addresses are merely illustrative and other techniques should be considered within the scope of this disclosure.

In step 404, the computer may launch a thread of operation for each identified network resource. In other words, the executable binary file may be configured as a multi-threader capable of collecting data from multiple network resources simultaneously. For each thread of operation, the computer may query a respective network resource for status and other information and retrieve the queried information. Using the multi-threaded application, the computer may contemporaneously pipe in data from multiple network resources to ensure that there are updates in a reasonable amount of time.

In step 406, the computer may query a respective network resource for each thread of operation. The query may be a direct query, with the computer querying the bios or firmware of the network resource directly as opposed to the conventional systems that query a third party database. Each query may be based upon the request received in step 402. For example, a first request may be for a first set of attributes and a second request may be for a second set of attributes, and the corresponding queries in step 406 may be for the first and second set of attributes, respectively. In addition to a query, the computer may also transmit the respective login credentials to the network resources for the network resources to authenticate the computer and accept the query. The login credentials may have been provided by or setup in conjunction with a respective vendor of each network resource. In some embodiments, the computer may store the login credentials in a database such that the user may not have to provide login credentials for subsequent runs. The login credentials may include, for example, a username and password. The username and password may be associated with a single sign-on (SSO) mechanism, i.e., the computer may use the username and password to sign on to a universal on-board administrator thereby gaining access to all the network resources controlled by the universal on-board administrator.

In step 408, the computer may retrieve information from a respective network resource for each thread of operation. The network resource may transmit a file to the computer containing the information. For example, if the computer has executed 100 threads of operation to query 100 network resources in step 406, the computer may receive 100 files containing respective queried information. In some embodiments, the files may be text files containing requested information in a space delimited or comma delimited format. From the received files, the computer may parse and store the relevant information of the network resources merging them to a single report file available to the end user. The computer may then automatically delete the multiple received files from remote network resources.

In some embodiments, one or more network resources may be redundant. For instance, an enclosure may have two management modules for each of active and standby mode, wherein each mode may be associated with an IP address. The computer may first query IP address with the active mode and if the query times out, may query the IP address with the standby mode. Such query will provide a notification to the computer whether a failover has occurred in the enclosure.

In step 410, the computer may generate a snapshot view file based on the retrieved information. In some embodiments, the computer may generate the snapshot view file in a hypertext markup language (HTML) format such that a user may access the snapshot file through a web-browser. The computer may integrate the retrieved the information and add HTML tags to generate the HTML file. The HTML file described herein is merely exemplary, and the computer may generate the snapshot view file in other computer readable format.

In step 412, the computer may transmit the snapshot view file or a link thereto to one or more user devices. In some embodiments, the computer may upload the snapshot view file to a SharePoint® server and generate a link to the file. The computer may then transmit the link to the user devices by forms of communications such as e-mail, instant messaging or any other form of electronic communication. In other embodiments, the computer may transmit the snapshot view file itself to the user devices for the user devices to store the snapshot view file locally.

In step 414, a user device may display the snapshot view in response to a respective user selecting the transmitted file or link. For the snapshot view file in HTML format, a user can select a link to the file or select the file and the user device may display the snapshot view in a web browser such as Internet Explorer®, Mozilla Firefox®, Google Chrome®, and/or Safari®. In other words, the user device does not require a specialized application for the snapshot view and use an existing web browser.

Figure 5:
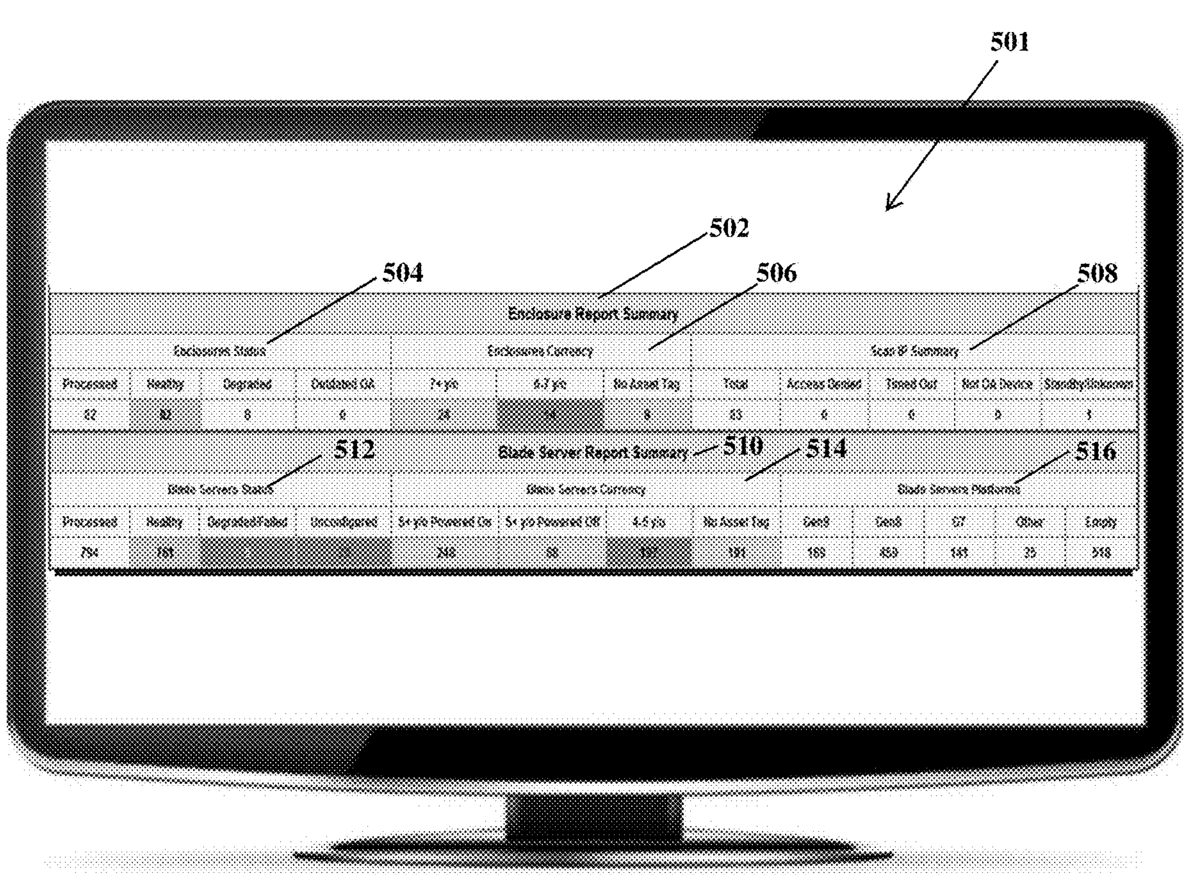
FIG. 5 shows an illustrative graphical user interface (GUI) showing an illustrative snapshot view of a network architecture.

FIG. 5 shows a graphical user interface (GUI) 500 with a first illustrative snapshot view 501 of network infrastructure. The snapshot view 501 may have been generated by a computer using the illustrative methods and illustrative principles described herein. The snapshot view 501, as shown herein, may display a summary of various network resources in the network infrastructure. For instance, the snapshot view 501 may display an enclosure report summary 502 of a remote enclosure within the network infrastructure. The enclosure report summary 502 may include enclosures status column 504 displaying the number of the enclosures that were processed for snapshot view 501. The enclosures status column 504 may further display, out of the processed enclosures, the number of healthy enclosures, the number of degraded enclosures, and/or the number of outdated onboard administrators. The enclosure report summary 502 may further include an enclosures currency tab 506 displaying the currency (age) of the enclosures. As an illustration, the currency tab 506 may display the number of enclosures that are more than seven years old, the number of enclosures that are six to seven years old, and/or the number of enclosures with no asset tags. The enclosure report summary 502 may further include a Scan IP summary column 508 displaying the summary of the internet protocol (IP) addresses that were scan by the computer. For instance, the scan IP summary 508 may display the total number of IP addresses that were scanned, the number of IP addresses that denied access to the computer, the number of IP addresses for which one or more requests by the computer were timed out, the number of IP addresses that were not associated with an on-board administrator (OA), and/or the number of IP addresses associated with unknown destination or devices. The snapshot view 501 may further display a blade server report summary 510. The blade server report summary 510 may display a blade servers status column 512 displaying the respective numbers of processed blade servers, healthy blade servers, degraded or failed blade servers, and/or unconfigured blade servers. The blade server report summary 510 may further display a blade servers currency column 514 displaying the currency statuses of the processed blade servers. As shown herein, the blade servers currency column 514 may include the respective numbers of powered on blade servers that are more than five years old, powered off blade servers that are more than five years old, blade servers that are four to five years old, and/or blade servers with no asset tag. The blade server report summary 510 may further include blade servers platforms column 516 displaying the respective numbers of blade servers associated with respective hardware platform. For example, a hardware platform may be the generation/version of the server hardware/software. The blade servers platform column 516 may further include the number of blade servers without platform information.

Figure 6:
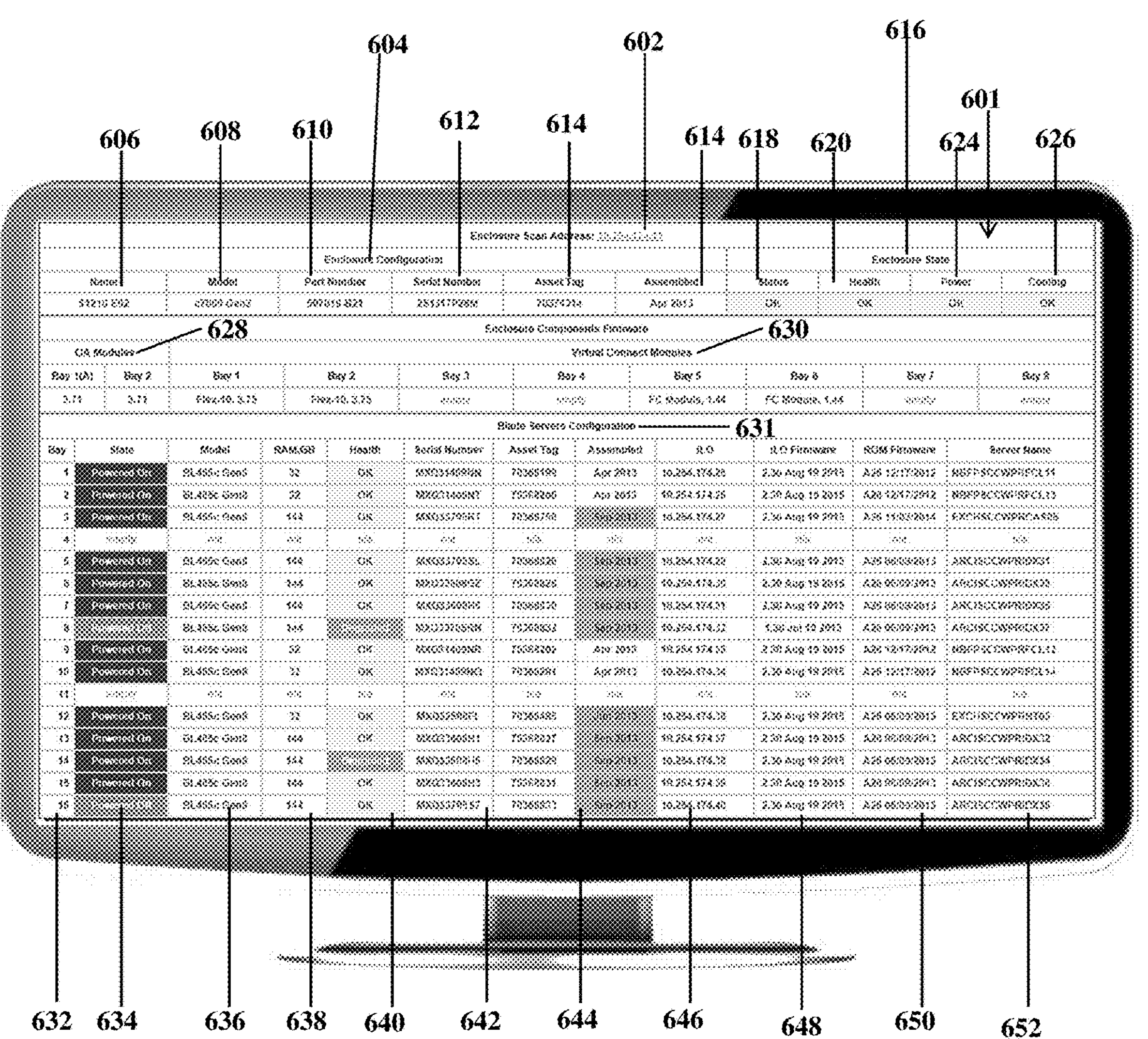
FIG. 6 shows a graphical user interface (GUI) with a second illustrative snapshot view of network infrastructure.

FIG. 6 shows a graphical user interface (GUI) 600 with a second illustrative snapshot view 601 of network infrastructure. The snapshot view 601 may have been generated by a computer using the illustrative methods and illustrative principles described herein. The snapshot view 601 may display the statuses of and information about blade servers within server enclosure (or simply "enclosure"). For instance, the snapshot view 601 may display the scan address 602 of the enclosure. In some embodiments, the scan address 602 of the enclosure may be the internet protocol (IP) address of the enclosure. The snapshot view 601 may further display an enclosure configuration 604 pane containing name 606, model 608, part number 610, serial number 612, asset tag 612, and/or assembly date 614 of the enclosure. The snapshot display may further display an enclosure state pane 616 containing overall status 618, health status 620, power status 624, and/or cooling status 626. The snapshot view 601 may further include online administrator (OA) module information column 628 containing information such as a version number of a respective OA. The snapshot view 601 may also include a virtual connect modules information column 630 containing information such as the model number of the virtual connect modules.

The snapshot view 601 may include a blade servers configuration pane 631 containing information of a plurality of blade servers included within the enclosure described above. Within the blade servers configuration pane 502, the snapshot view 601 may display bay number column 632 showing a sequence number for a bay containing a respective blade server. The snapshot view 601 may further display a state column 632 showing the state of the respective blade server. As shown, the state may be "Powered On" for a blade server that is powered on, "Powered Off" for a blade server that is powered off and "Empty" for a bay that that does not contain a blade server. A model column 636 may show the model number of the respective blade server. A RAM column 638 may show the size of the random access memory (RAM) of the respective blade server. A health column 640 may show the health status of the blade server. Illustrative health statuses may include "OK" for a healthy blade server and "Degraded" for a blade server with degraded health status. A serial number column 642 may show the hardware serial number of the respective blade server. An asset tag column 644 may show the asset tag for the respective blade server. An assembled date column 644 may show the assembly date (currency information) of the respective blade server. A server management firmware version column 646 may show the version of the server management firmware of the respective blade server. A server management firm update date column 648 may show the update date of the server management firmware for the respective blade server. A read only memory (ROM) firmware column 650 may show the version name and the latest update date of the respective blade server. A server name column 652 may show the name of the respective blade server.

The illustrative snapshot views 501, 601 may show uniform resource locators (URLs) for active onboard administrators (OAs) such that the user may open the respective web page from the snapshot views 501, 601. The snapshot views 501, 601 may further incorporate pseudo 3D features for a better user experience. In some embodiments, one or more snapshot view files generating the snapshot views 501, 601 may be in HTML5 format and configured to be displayed in web browsers such as Google Chrome®, Microsoft Internet Explorer®, Mozilla Firefox®, Safari®, and web browsers running in mobile devices.

The illustrative snapshot views 501, 601 may color code the display to indicate the health of the respective network resource. To indicate the health state of an enclosure, the snapshot views 501, 601 may display informational status, such as indicating that the enclosure is turned off, in a neutral color such as white or beige. The snapshot views 501, 601 may indicate that the enclosure has no issues in green, warnings in yellow, and critical condition in red. For the currency of server blades, the snapshot views 501, 601 may display informational status in beige, an alert status in pink, and a warning status in yellow. It should be understood that these color codes are merely illustrative, and other color codes may be used without deviating from the scope of this disclosure.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for generating a snapshot view containing hardware information and status information in a network infrastructure, the method comprising:

obtaining, by a computer, an input text file indicating a plurality of internet protocol addresses of a plurality of servers of a network infrastructure;

authenticating, by the computer, to one or more universal on-board administrators corresponding to the plurality of servers indicated by the input text file, for at least one universal on-board administrator, the computer is authenticated through a single sign-on (SSO) mechanism using a set of login credentials for the universal on-board administrator;

for each internet protocol address:

transmitting, by the computer, a query to a server in an active mode having the internet protocol address and associated with the universal on-board administrator and to a second server in a standby mode having a second internet protocol address;

responsive to a listener of a plurality of listeners that correspond to the plurality of servers of the computer detecting a time out of the query at the server in the active mode, transmitting, by the computer, the query to a second server in the standby mode having the second internet protocol address; and responsive to the listener detecting response data from the second server corresponding to the listener, receiving, by the computer, a machine-readable information file containing status information for the second server having the second internet protocol address, wherein the response data includes the machine-readable information file; and generating, by the computer, a snapshot view for the network infrastructure based upon each machine-readable information file received from the plurality of servers, the snapshot view comprising hypertext markup language code for displaying the status information for each server.

2. The method according to claim 1, further comprising transmitting, by the computer to a user device, an electronic communication containing a selectable link configured to retrieve a snapshot view file from a non-transitory storage memory, the snapshot view file including the snapshot view for display at the user device.

3. The method according to claim 1, further comprising executing, by the computer having a multi-threading controller, a plurality of threads of operation of the computer, each respective thread executes for querying the respective status information of a different server of the plurality of servers.

4. The method according to claim 1, wherein transmitting the query to the server includes querying, by the computer, using the internet protocol address of the server, the server to retrieve the machine-readable information file comprising a resource data record containing the status information comprising hardware information and an operational status of the server.

5. The method according to claim 1, further comprising identifying and querying, by the computer, the universal onboard administrator interface of the server.

6. The method according to claim 1, further comprising receiving, by the computer, a request to generate the snapshot view, wherein the request includes the input text file containing the plurality of internet protocol addresses of the plurality of servers in the network infrastructure.

7. The method according to claim 1, wherein receiving from the second server the machine-readable information file containing the status information of the second server includes extracting, by the computer, the status information comprising hardware information and operational status of the second server from the machine-readable information file.

8. The method according to claim 1, wherein each server of the plurality of servers is either in the active mode or the standby mode, and wherein the computer transmits a first set of one or more queries to a first subset of the plurality of servers in the active mode before transmitting a second set of one or more queries to a second subset of the plurality servers in the standby mode.

9. The method according to claim 1, wherein the set of login credentials includes an encrypted username and an encrypted password for the universal on-board administrator.

10. The method according to claim 1, wherein the status information of the second server includes hardware information, and wherein the hardware information includes at least one of model number, size of random access memory, hardware serial number, asset tag, assembly date, server management firmware version, server management firmware update date, or read-only memory firmware version.

11. A system comprising:

a computer comprising at least one processor, configured to:

obtain an input text file indicating a plurality of internet protocol addresses of a plurality of servers of a network infrastructure;

authenticate the computer to one or more universal on-board administrators corresponding to the plurality of servers indicated by the input text file, for at least one universal on-board administrator, the computer is authenticated through a single sign-on (SSO) mechanism using a set of login credentials for the universal on-board administrator;

for each internet protocol address:

transmit a query to a server in an active mode having the internet protocol address and associated with the universal on-board administrator;

responsive to a listener of a plurality of listeners that correspond to the plurality of servers of the computer detecting a time out of the query at the server in the active mode, transmit the query to a second server in the standby mode having the second internet protocol address; and responsive to the listener detecting response data from the second server corresponding to the listener, receive a machine-readable information file containing status information for the second server having the second internet protocol address, wherein the response data includes the machine-readable information file; and generate a snapshot view for the network infrastructure based upon each machine-readable information file received from the plurality of servers, the snapshot view comprising hypertext markup language code for displaying the status information for each server.

12. The system according to claim 11, wherein the computer is further configured to transmit, to a user device, an electronic communication containing a selectable link configured to retrieve a snapshot view file from a non-transitory storage memory, the snapshot view file including the snapshot view for display at the user device.

13. The system according to claim 11, wherein the computer is further configured to execute, by a multi-threading controller of the computer, a plurality of threads of operation of the computer, each respective thread executes for querying the respective status information of a different server of the plurality of servers.

14. The system according to claim 11, wherein, when transmitting the query to the server, the computer is further configured to query the server, using the internet protocol address of the server, to retrieve the machine-readable information file comprising a resource data record containing the status information comprising hardware information and an operational status of the server.

15. The system according to claim 11, wherein the computer is further configured to identify and query the universal onboard administrator interface of the server.

16. The system according to claim 11, wherein the computer is further configured to receive a request to generate the snapshot view, wherein the request includes the input text file containing the plurality of internet protocol addresses of the plurality of servers in the network infrastructure.

17. The system according to claim 11, wherein, when receiving from the second server the machine-readable information file containing the status information of the second server, the computer is further configured to extract the status information comprising hardware information and operational status of the second server from the machine-readable information file.

18. The system according to claim 11, wherein each server of the plurality of servers is either in the active mode or the standby mode, and wherein the computer is configured to transmit a first set of one or more queries to a first subset of the plurality of servers in the active mode before transmitting a second set of one or more queries to a second subset of the plurality servers in the standby mode.

19. The system according to claim 11, wherein the set of login credentials includes an encrypted username and an encrypted password for the universal on-board administrator.

20. The system according to claim 11, wherein the status information of the second server includes hardware information, and wherein the hardware information includes at least one of model number, size of random access memory, hardware serial number, asset tag, assembly date, server management firmware version, server management firmware update date, or read-only memory firmware version.

* * * * *